United States Patent [19]
Lange

[11] 3,872,544
[45] Mar. 25, 1975

[54] POWER DRIVEN FISH SCALER

[76] Inventor: Frederick W. Lange, 112 East Shaw St., Charlotte, Mich. 48813

[22] Filed: Apr. 13, 1973

[21] Appl. No.: 351,032

[52] U.S. Cl. .................................................. 17/64
[51] Int. Cl. ............................................ A22c 25/02
[58] Field of Search ................................. 17/67, 64

[56] References Cited
UNITED STATES PATENTS

| | | | |
|---|---|---|---|
| 2,655,689 | 10/1953 | White | 17/67 |
| 2,884,658 | 5/1959 | Johnson | 17/67 |
| 3,072,956 | 1/1963 | Olrich | 17/67 |
| 3,328,834 | 7/1967 | Pulcifer | 17/67 |

Primary Examiner—Robert Peshock
Attorney, Agent, or Firm—Clarence A. O'Brien & Harvey B. Jacobson

[57] ABSTRACT

A fish scaling tool for use on and in conjunction with a properly usable prime mover, for example, an electric drill or a flexible power delivering shaft, having handle means provided with a power take-off chuck. This tool comprises an elongated rotatable shaft-like member having a reduced shank at an inner end operatively connectible with said chuck, said member being cylindrical and provided with a plurality of circular holes. The respective open ends of the distributively located holes provide manually applicable and guidingly controllable scaling and scraping edges. For best results this shaft-like member is preferably hollow, is relatively small in diameter, and the outer terminal end is provided with one or more special purpose scaling notches.

8 Claims, 4 Drawing Figures

PATENTED MAR 25 1975　　　　　　　　　　　　　　　　　3,872,544

POWER DRIVEN FISH SCALER

This invention relates to power driven fish scaling devices characterized, broadly construed, by a portable manually controllable rotary shaft or tool whose working surface is provided with scale dislodging means and pertains, more particularly, to a tool which is equipped with improved scaling and scraping means.

More particularly, the concept comprehends the adoption and use of a hollow cylindrical shaft-like member having a reduced shank at an inner end adapted to fit into power driven chuck, the tool proper having unique distributively arranged cutting and scraping edges, and the outer end having notches providing special purpose cutting edges.

For background purposes several prior patents showing power driven rotary fish scalers are deemed to be exemplary of the state of the art to which the present invention relates. U.S. Pat. No. 2,655,689 granted to Walter R. Witte shows that it is old to provide a prime mover such as an electric motor which drives flexible shaft means to which the shank of a rotatable scaling element is drivingly connected. Secondly, the fish scaler shown in U.S. Pat. No. 3,072,956 granted to Walter Olrich is such in construction and performance that it too is worthy of consideration. As having a closer bearing on the subject matter of the instant invention attention is invited to U.S. Pat. No. 3,328,834 covering a rotary fish scaler and granted to Russell A. Pulcifer.

An object of the present invention is to advance the art to which the same relates and, in so doing, to provide an end product which is structurally and functionally novel and, being an innovation, will be endorsed and approved by manufacturers. Also, and because the tool proper is hollow, cylindrical and of minimal outside diameter, it is less likely to clog with scales and, under the circumstances, is self-cleaning in character. Experimental use has repeatedly shown that the circular cutting holes will not nick or gouge the flesh of the fish and because there are no projecting or protruding blades or teeth, the likelihood of injury to the hands of the user is reduced to a practical and acceptable minimum.

Briefly the herein disclosed power driven scaler comprises, in combination, a portable prime mover providing a source of power and having a conveniently grippable and usable handle, more particularly, a handle which in turn is provided with a power delivering takeoff chuck and which is capable of being manipulatably held and used in one hand of the user. This chuck serves to accommodate the readily applicable and removable rotatable scale dislodging and removing tool which may be described as a shaft or as a shaft-like elongated member having an axial shank at one end drivingly connected to the chuck. This member or shaft has a plurality of distributively arranged individual circular holes which are drilled therethrough and are at right angles to the longitudinal axis of the member. These distributively arranged holes provide marginal edges which are peripherally located at the respective outer ends of the holes and provide scaling and scraping edges which, as experience has shown, well serve the purposes for which these edges are constructed.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 2:
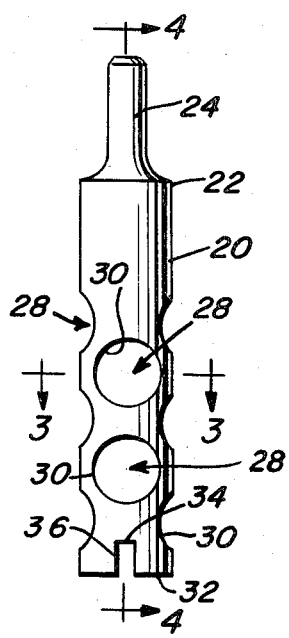
FIG. 2 is a view in elevation of the overall tool by itself showing the preferred actual size thereof in keeping with present prevailing practice.
Figure 3:
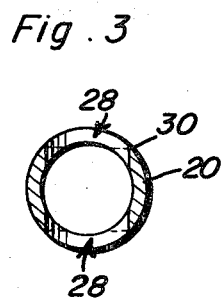
FIG. 3 is a slightly enlarged cross section taken approximately on the plane of the line 3—3 of FIG. 2 looking in the direction of the indicating arrows.
Figure 4:
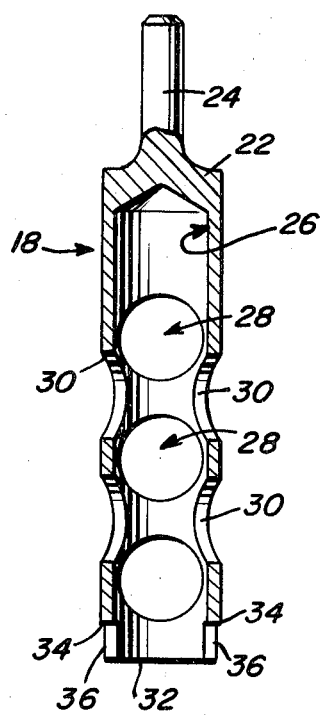
FIG. 4 is an enlarged central longitudinal sectional view taken approximately on the plane of the section line 4—4 of FIG. 2.

By way of introduction to the description of the details it is to be reiterated that the tool shown in FIGS. 2, 3 and 4 is designed and adapted to be used in cooperative association with a power supply prime mover. The adaptation shown comprises an electric portable drill 6 having a hand-held housing or casing 8 and provided at the working end 10 with an offset suitably mounted and constructed chuck 12. In practice the fish to be scaled is denoted at 14 and is positioned for scaling on a suitable support surface 16.

With reference in particular to FIG. 4 the tool, broadly stated, is denoted by the numeral 18 and is made from a length of steel shafting five-eighths inch in cross section. The overall length (FIG. 2) may be and preferably is 4 inches, the shaft or body portion being cylindrical and denoted at 20. The inner end, the end toward the user, is denoted by the numeral 22 and is closed and the axial reduced shank is denoted at 24, the shank being adapted to be retentively fitted into the chuck when in use as brought out in FIG. 1. The body portion of the shaft or member is longitudinally or axially bored as brought out in FIG. 4 to provide the desired hollow portion 26. Distributively arranged circular holes are drilled, these holes being denoted at 28 and being of half-inch dimension, there being three holes longitudinally spaced on one side and two staggered and located on the other side, these five holes being adequate as experience has shown, for satisfactory scaling and scraping results. The outer marginal edges 30 provide the desired cutting and scaling edges and as experience has shown do not destroy any of the meat on the fish and minimize the likelihood of injury to the user.

In addition to the circular holes and the inherent cutting edges provided thereby experience has shown that it is also desirable to provide at least one notch, preferably two, at the outer end portion 32. More specifically the notches are denoted at 34 and open through the edge 32 and the parallel edges 36 thereof provide the desired cutting edges. These comparably small notches at the end of the scaler are used for scaling close to the fins and in areas which are hard to reach and are utilized by positioning the notched surfaces flat on the area to be scaled.

Figure 1:
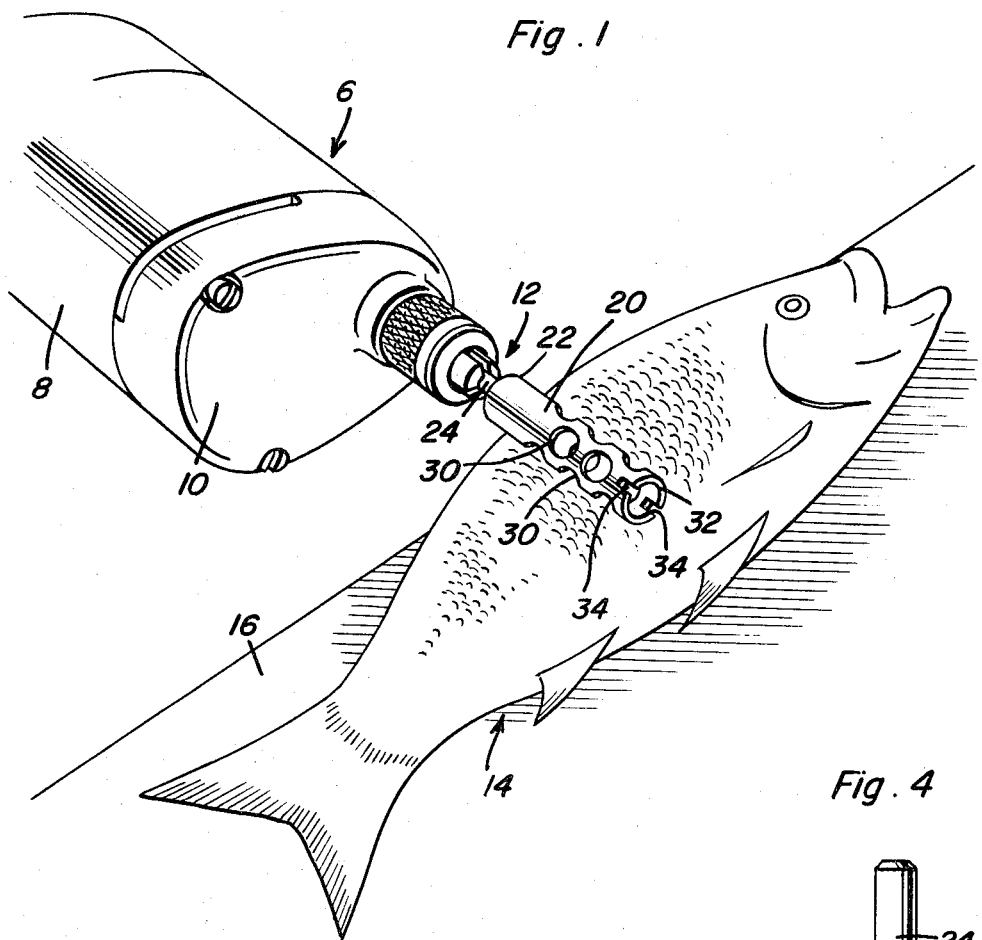
FIG. 1 is a view in perspective showing a power driven fish scaler constructed in accordance with the principles of the invention and showing the shank thereof connected with a chuck on a manually usable and controllable electric drill, the apertured tool being shown in a manipulatable position.

As is evident FIGS. 2, 3 and 4 show the construction of the improved scaling and scraping tool. On the other hand FIG. 1 shows one manner of using it, that is, wherein the shank 24 is joined with the chuck on the hand-held electric drill 6. In actual practice the shank could be attached to a chuck on handle means at the end of a flexible power driven shaft as shown in the aforementioned Witte U.S. Pat. No. 2,655,689.

A careful consideration of the views of the drawing in conjunction with the description will enable the reader to obtain a clear and comprehensive understanding of the invention and its manner of use. A more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A power operated manually controllable fish scaling device comprising, a portable prime mover providing a source of power and having conveniently grippable and usable handle means provided with a power delivering and take-off chuck and capable of being manipulatively held in one hand of the user, and a readily applicable and removable rotatable scale dislodging and removing tool, said tool comprising an elongated member having an axial shank at one end drivingly connected to said chuck, said member being rigid and shaft-like, cylindrical in transverse section and having a plurality of distributively arranged individual circular holes drilled therethrough at right angles to the longitudinal axis of said member, the marginal edges at the respective inwardly facing portions of said holes being sharp and providing scaling and scraping edges.

2. The fish scaling device defined in claim 1, and wherein said member is hollow.

3. The fish scaling device defined in claim 1, and wherein said member has an axial lengthwise bore which is wholly closed at an inward end and open at its outward end.

4. The fish scaling device defined in claim 3, and wherein the overall tool is made of stainless steel.

5. The fish scaling device defined in claim 3 and wherein said prime mover is characterized by a portable electric drill embodying a portable housing which is of a shape and size that it is adapted to be grasped and manipulatively and reliably held in one hand of the user, said tool being made from a prescribed length of five-eighths inch steel shafting, said member being 4 inches in length and said shank being three-fourths inch in length.

6. The fish scaling device defined in claim 3 and wherein the outer end of said member is provided with at least one relatively small scaling notch, said notch opening through said outer end and, said notch being adapted for use when scaling close to fins and in other difficult-of-access surface areas.

7. For use on and in conjunction with a portable prime mover, an electric drill for example, having handle means provided with a power take-off chuck, a readily applicable and removable fish scaling tool comprising an elongated shaft-like member having an integral reduced axial shank at an inner end and provided with a plurality of circular cutting edges distributively located for manually applicable and guidingly controllable scaling and scraping use, and said member being made of steel shafting, said shafting being axially and longitudinally bored, hollow, closed at an inner end and open at an outer end, and having a plurality of holes drilled therethrough at right angles to the longitudinal axis, said holes being circular and open-ended and the respective inwardly facing portions being sharpened and providing the aforementioned cutting edges.

8. The fish scaling device defined in claim 7 and wherein the outer end of said member is provided with at least one relatively small scaling notch, said notch opening through said outer end, said notch being adapted for use when scaling close to fins and in other difficult-of-access surface areas.

* * * * *